May 30, 1961   D. G. BOOTH ET AL   2,986,096
JOURNAL BEARING

Filed Oct. 18, 1956   2 Sheets-Sheet 1

May 30, 1961 D. G. BOOTH ET AL 2,986,096
JOURNAL BEARING
Filed Oct. 18, 1956 2 Sheets-Sheet 2

United States Patent Office 2,986,096
Patented May 30, 1961

2,986,096
JOURNAL BEARING

Douglas Gerhard Booth, Ilford, and Robert Spurgeon Wood, Romford, England, assignors to The Plessey Company Limited, Ilford, England, a British company Filed Oct. 18, 1956, Ser. No. 616,893

Claims priority, application Great Britain Oct. 24, 1955

8 Claims. (Cl. 103—126)

This invention relates to the lubrication of journal bearings of rotary fluid displacement devices. More particularly but not perhaps exclusively it relates to journal bearings for gear type pumps, such gear type pumps may be driven by external power to deliver liquid or driven by liquid to act as motors.

When a gear pump using plain journal bearings is operated at high pressure, it is necessary to provide a flow of lubricant through the bearing for lubrication and cooling.

It is an object of the present invention to provide a positive displacement pump having improved means for lubricating the journal bearings by means of pumping fluid without thereby reducing the useful delivery of the pump.

For this purpose according to the present invention a helical groove is provided in the bore of at least one journal bearing, both ends of the bore being connected to points in the pump housing under equal pressure, preferably under inlet pressure in a pump for delivering liquid, so that rotation of the shaft in the bearing induces a flow of operating liquid along the helix to act as lubricant and covering liquid. A portion of this liquid is carried round by the shaft and forms a fluid film separating the shaft from the bore of the bearing.

It is essential that this fluid film is maintained as a continuous area on the loaded side of the bearing so that it can give the maximum support to the shaft. To achieve this the helical groove is arranged to traverse the length of the bearing while forming not more than about two-thirds of a turn in the bore, at least the greater part of the length of the groove being arranged on the non-loaded side of the bearing, so that the groove will not cut into the area of the fluid film supporting the shaft sufficiently to cause any significant loss of area.

When the pump is required to deal with low viscosity fluids and fluids with poor lubricating properties, it is essential to get the largest possible flow of fluid through the bearing to help maintain the fluid film and also to cool the bearing.

It has been found that the best type of groove to provide a flow of fluid in this way is a relatively shallow groove with a width three or more times, for example, its depth. To obtain a greater flow of fluid it is proposed to provide a multiplicity of grooves in the bore. Preferably these grooves are arranged so close together as to become in fact a single wide groove with one or more narrow longitudinal partitions dividing the groove into a number of sections of equal width. The edges, or at least the outer edges of the grooves, are preferably chamfered to allow the fluid carried round by the shaft to pass more readily into the clearance between the shaft and the bore of the journal. In a preferred construction passages are provided to allow access of low pressure fluid to both ends of the journal bearing. To reach the inner end of the bearing when the journal and face bearing of the gear are made in one piece, grooves connecting the bore of the bearing to the inlet side of the pump are preferably provided across the face of the bearing. The direction of the flow in the helical grooves may be either towards or away from the side faces of the gears. In the case of a pump with one-piece bearings the direction of flow is preferably arranged to go from the inlet port area to the outer ends of the journal bearings, up the helical grooves towards the side faces of the gears and out along the grooves in the face of the bearing back to the inlet port area. This direction of flow avoids any difficulties that might arise from taking the lubricating flow from a region of high turbulence such as exists at the root of the gear teeth on the inlet side of the pump. When the pump is operated as a motor, the directions of rotation and flow are reversed, so that the port which is connected by the grooves in the bearing face to the inner ends of the journal bearings becomes the outlet port, which again will be the low-pressure port.

In either case the advantage claimed for the helical groove method of lubricating as applied to the pump bearings is that it allows a large flow of fluid to be passed through the bearings with no loss of pump capacity such as occurs when the lubricating flow is provided by metering a proportion of the fluid at delivery pressure to the bearings.

The accompanying drawings illustrate somewhat diagrammatically one form of gear pump according to the invention.

Figure 1:
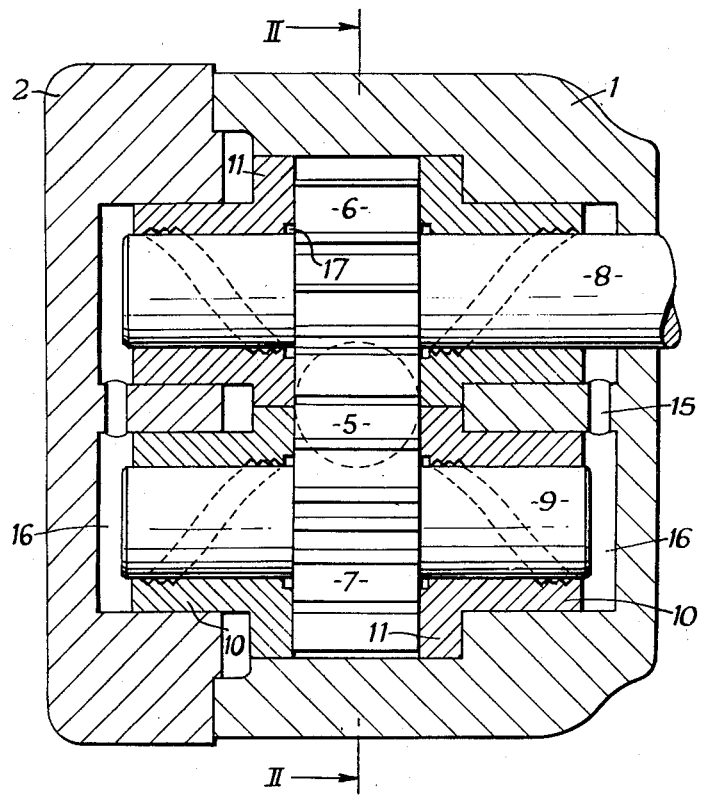
Fig. 1 is an axial section of the pump.

Referring now to the drawings, the pump has a housing made in two parts 1, 2 enclosing a pumping chamber 3 with an inlet connection 4 and a delivery connection 5. The pumping gears 6 and 7 are respectively integral with shafts 8 and 9 forming suitable journals. The latter are supported in bearing bushes 10, which are fitted in the housing and which, in a known manner, are provided with end flanges 11 held in contact with the side faces of the gears by fluid pressure supplied by the pump.

Figure 2:
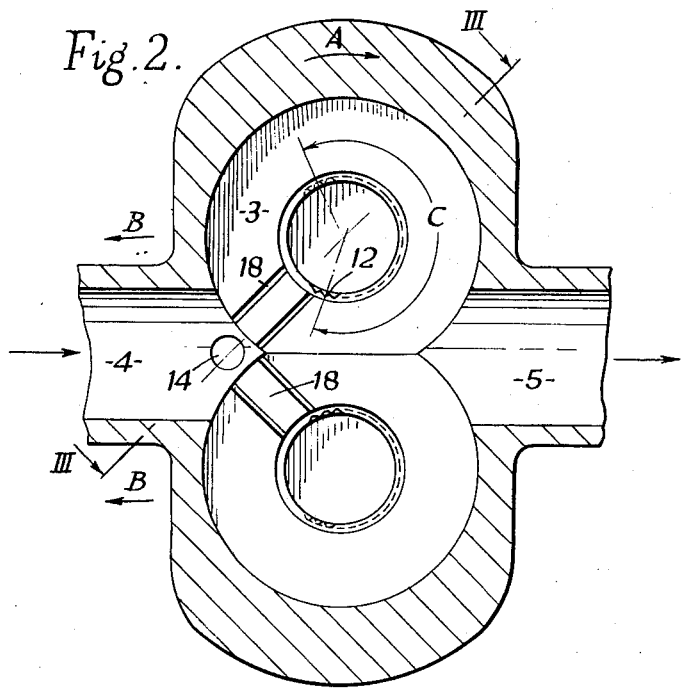
Fig. 2 is a cross-section on line II—II of Fig. 1 without the pumping gears.

When the shaft 8 is driven to rotate the gears in the direction of the arrow A, Fig. 2, liquid from inlet 4 is conveyed round the circumference of the gears 6, 7, to the delivery 5, against load pressure. The pressure distribution round the two gears 6 and 7 results in a force on the bearings of each gear in the direction of the arrows B.

Figure 4:
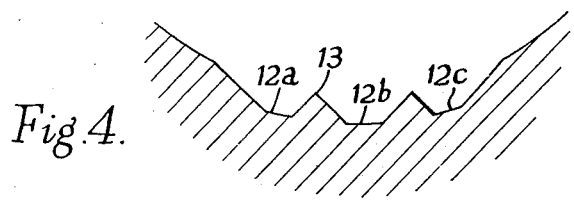
Fig. 4 is an enlarged section showing the profile of the helical groove.

Lubrication to support this load is obtained, according to a feature of the invention, by the provision of helical grooves 12 which wind around the bearing bores from the outer ends thereof in the directions in which the journals rotate to the inner ends of the bearings and extend over an arc C which faces substantially in the direction of the load as indicated by the arrows B. As shown best in Fig. 4, each groove 12 is subdivided by ridge-like partitions 13 into three mutually adjacent sub-grooves 12a, 12b, and 12c, the width of each sub-groove at its upper, open side being three to four times the depth of the groove. The walls of the sub-grooves are chamfered, as shown at 13a, 13b to facilitate movement of fluid adhering to the shaft journal into the gap between the journal and the bearing surface in the bore.

Operating fluid at pump-inlet pressure is admitted to the outer ends of the bearings by passages 14, 15, in the pump housing, leading to chambers 16 at the outer end of each bearing. An annular distribution chamber 17 at the inner end of each bearing communicates with the pump inlet 4 through a radial groove 18 cut into each flange 11 to face the pumping gears.

Figure 3:
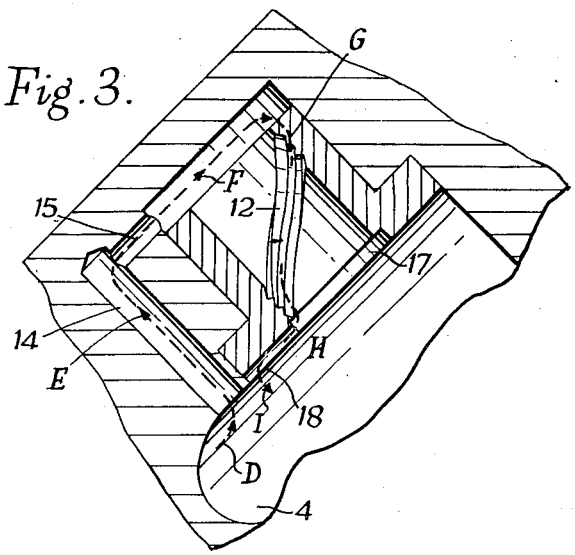
Fig. 3 is a part-section on line III—III of Fig. 2.

As a result of this construction, when the pump operates, viscosity forces will produce a flow of operating fluid at pump-inlet pressure to pass through the pump bearings in the direction of the arrows D, E, F, G, H, Fig. 3, at a rate which has in practice been found highly satisfactory, even when pumping liquids of low viscosity.

What we claim is:

1. A gear pump comprising a housing formed with a pump chamber, a pair of intermeshing tooth rotors housed in said chamber and dividing the chamber into a high-pressure part and a low-pressure part, each of said parts being provided with an external connection, each rotor being formed with at least one journal, the housing having bearing bores for supporting each journal and having passage means interconnecting the two ends of each bearing bore respectively with two points in the low pressure part of the pump chamber, each bearing bore being formed with a groove extending substantially from end to end of such bore and forming part of a single helical turn leaving clear a sector of the bore adjacent the low-pressure part of the pump chamber, to produce a circulation of pumping liquid through the groove and passage means independent of the flow controlled by the rotor teeth.

2. A pump as claimed in claim 1, wherein said groove has a width at least approximately twice its depth and is subdivided by at least one raised ridge with a plurality of parallel grooves.

3. A positive displacement pump as claimed in claim 1, wherein the width of said helical groove is at least twice its depth.

4. A positive displacement pump as claimed in claim 1, wherein the width of the helical groove is at least twice its depth and is sub-divided by a partition extending along the groove.

5. A positive displacement pump as claimed in claim 1, wherein the width of the helical groove is more than three times its depth, the groove being sub-divided by two helical partitions.

6. A pump as claimed in claim 1, wherein said passage means interconnecting the inner end of each bearing groove with the low-pressure part of each pump chamber is a radial groove in the end face of the bearing adjacent to each pumping gear interconnecting the inlet port with the adjacent end of the helical groove.

7. A pump as claimed in claim 1, wherein the helical groove extends over not more than two thirds of a full turn.

8. A gear pump comprising a pair of intermeshing gears each having two parallel side faces and a journal projecting from such side faces, a pump housing having a pump chamber accommodating the gears and co-operating with the side faces of the gears and with part of the circumference of each gear to be sub-divided by the intermeshing gear into an inlet chamber and an outlet chamber, an inlet and an outlet respectively communicating with said inlet and outlet chambers, bearings in said housing for each said journal each having a bore for co-operation with such journal, an annular passage being provided round at least one journal at one end of the bore between the bearing and journal adjacent the junction of such journal with the side face of its gear and a passage in the bearing, connecting said annular passage with a point in the inlet chamber, a bearing-end chamber in the housing freely communicating with the other end of the bore of said bearing, said bore being formed with a helical groove interconnecting said annular passage with said bearing end chamber for producing, by viscosity pump action a flow between said annular passage and bearing end chamber when the journal rotates in the bearing, and a passage in the housing, connecting said bearing end chamber to another point in the inlet chamber, the cross-section of said passage in the housing being substantially greater than that of the helical groove, said helical groove forming less than one complete helical turn so as to leave clear a sector of the bearing surface at that side at which the inlet chamber is arranged.

References Cited in the file of this patent

UNITED STATES PATENTS

| | | |
|---|---|---|
| 1,682,842 | Hamer | Sept. 4, 1928 |
| 1,826,057 | Dobbins | Oct. 6, 1931 |
| 2,249,843 | Marsland | July 22, 1941 |
| 2,276,107 | Simons | Mar. 10, 1942 |
| 2,420,622 | Roth et al. | May 13, 1947 |
| 2,676,548 | Lauck | Apr. 27, 1954 |
| 2,695,566 | Compton | Nov. 30, 1954 |